June 6, 1950  R. G. LE TOURNEAU  2,510,896
IN PLACE BEARING ADJUSTMENT WRENCH
Filed Jan. 17, 1949
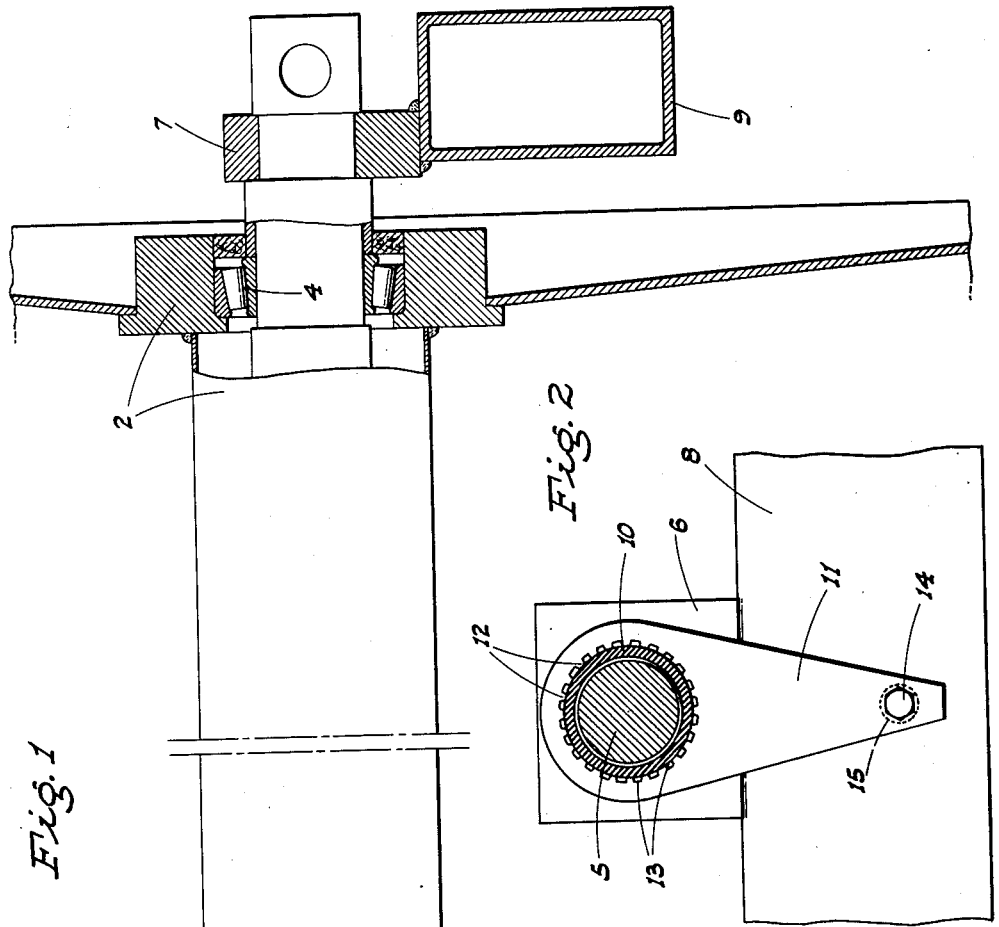
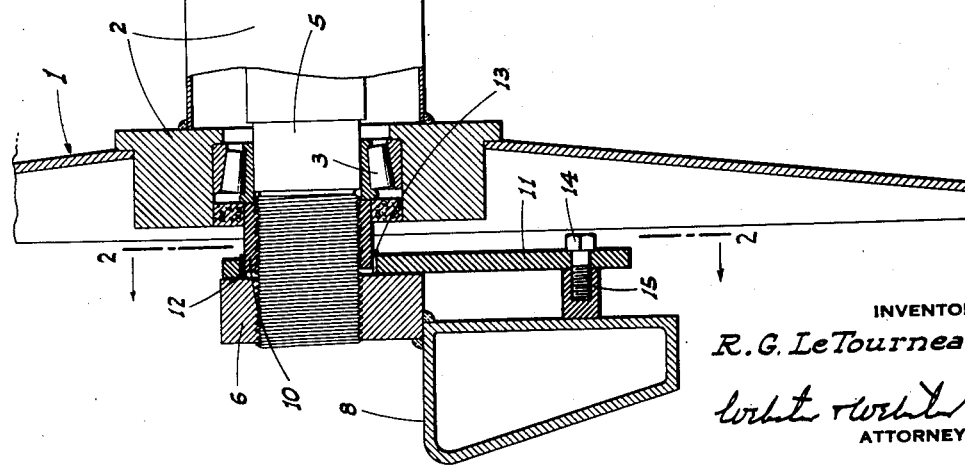
INVENTOR
R. G. LeTourneau
ATTORNEYS Patented June 6, 1950

2,510,896

UNITED STATES PATENT OFFICE 2,510,896

IN-PLACE BEARING ADJUSTMENT WRENCH

Robert G. Le Tourneau, Longview, Tex., assignor to R. G. Le Tourneau, Inc., Stockton, Calif., a corporation of California Application January 17, 1949, Serial No. 71,265

8 Claims. (Cl. 308—207)

In earth working implements of certain types, and in many other machines, a rotary device is mounted on a spindle by means of a bearing assembly which includes a take-up nut threaded on the spindle at one end of such bearing assembly. It is the general practice to adjust such nut by a separate hand-tool or wrench.

The present invention is directed to, and it is an object to provide, a bearing adjustment wrench which is arranged in a novel manner as an in-place member of the implement or machine, so that such wrench is always available for ready and convenient use.

A further object of the invention is to provide an in-place bearing adjustment wrench which is normally but releasably secured to an adjacent fixed part; the wrench radiating from the nut and being adjustable with regard to its direction of projection whereby, when the bearing take-up nut is adjusted, the wrench can be adjusted to a predetermined position relative to said fixed part.

A further object of the invention is to provide an in-place bearing adjustment wrench which acts—when in its normally fixed position—as an effective lock for the bearing take-up nut.

It is also an object to provide an in-place bearing adjustment wrench which is designed for economy and ease of manufacture.

A further object of the invention is to provide a practical and reliable in-place bearing adjustment wrench, and one which will be exceedingly effective for the purpose for which it is designed.

These objects are accomplished by means of such structure and relative arrangement of parts as will fully appear by a perusal of the following specification and claims.

In the drawings:

Fig. 1 is a sectional elevation of a spindle-mounted bearing assembly for a rotary device; said assembly incorporating the in-place bearing adjustment wrench.

Fig. 2 is a cross section on line 2—2 of Fig. 1.

Referring now more particularly to the characters of reference on the drawings, the invention is here shown as embodied in connection with a rotary device in the form of an earth roller, indicated in part at 1, which earth roller includes a hub assembly, indicated generally at 2.

The hub assembly 2 is supported, adjacent its ends, by bearings 3 and 4 mounted on a non-rotary spindle 5; said bearings being of tapered roller type and mounted in opposition. The spindle 5 is affixed at its ends in connection with corresponding mounting blocks 6 and 7, which mounting blocks are in turn secured to transversely spaced side beams 8 and 9 of the implement or machine in which the earth roller 1 is included.

The assembly of the bearings 3 and 4 is adapted to be adjusted by a rotary, bearing take-up nut 10 threaded on the spindle 5 between the bearings 3 and mounting block 6.

Except for the provision of the present invention, it would be necessary to insert a separate or initially detached wrench between the mounting block and adjacent end of the hub assembly 2, for the purpose of gripping and rotatably adjusting the bearing take-up nut 10.

However, the present invention makes possible the adjustment of said nut 10 without the need of any separate wrench, and this is accomplished as follows:

A radially extending wrench and locking arm 11 is splined to the nut 10; the wrench splines being indicated at 12, while the nut splines are indicated at 13.

From the nut 10 the wrench 11 normally extends downward, and adjacent its then lower end said wrench is secured by a cap screw 14 to an attachment block or boss 15 on the inner face of the adjacent side beam 8. The wrench 11 is flat endwise of the bearing assembly, and thus normally abuts flush against the adjacent end of the boss 15.

When it is desired to adjust the bearing take-up nut 10, the cap screw 14 is removed, and then said nut is rotated on the threaded portion of the spindle 5 by movement of said wrench thereabout. After the nut 10 is thus adjusted it is necessary that the wrench 11 be returned to its dependent position for attachment to the boss 15, and this is accomplished in the following manner:

The wrench 11 is relatively thin, and the nut splines 13 are of limited extent, terminating short of the adjacent end of the hub assembly 2 a distance greater than the thickness of said wrench. Thus, after a nut adjusting operation the wrench 11 is slid inwardly until it clears the nut splines 13, whereupon the wrench is turnable, free, about said nut until the wrench is in position for attachment to the boss 15. The wrench is then returned to engagement with the nut splines 13, and the cap screw 14 is re-applied.

It should also be noted that in its normal dependent position secured to the boss 15, the wrench 11 serves as a lock for the bearing take-up nut 10, preventing the latter from accidentally rotating out of adjustment.

As the boss 15 projects laterally inward from the side beam 8, the wrench is in a position which allows it to be readily manually turned without interference from, or hand injury by, said side beam.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In combination with a bearing assembly including a spindle, bearings on the spindle, fixed parts supporting opposite ends of the spindle, and a bearing take-up nut threaded on the spindle adjacent one fixed part; an in-place wrench on and radiating from the nut, and means normally but releasably secured the wrench to said one fixed part.

2. In combination with a bearing assembly including a spindle, bearings on the spindle, fixed parts supporting opposite ends of the spindle, and a bearing take-up nut threaded on the spindle adjacent one fixed part; an in-place wrench on and radiating from the nut, and means normally but releasably securing the wrench to said one fixed part; the wrench being splined to the nut.

3. In combination with a bearing assembly including a spindle, bearings on the spindle, fixed parts supporting opposite ends of the spindle, and a bearing take-up nut threaded on the spindle adjacent one fixed part; an in-place wrench on and radiating from the nut, and means normally but releasably securing the wrench to said one fixed part; the wrench being splined to the nut, and the spline being formed to permit of axial displacement of the wrench to a position wherein the wrench is free for turning about the nut.

4. A combination, as in claim 3, in which the wrench displaces axially in a direction away from said one fixed part.

5. A combination, as in claim 3, in which the wrench displaces axially in a direction away from said one fixed part; the wrench being flat endwise of the bearing assembly and normally abutting, in facing relation, against said one fixed part.

6. A combination, as in claim 5, in which the wrench securing means is a cap-screw connecting the wrench to said one fixed part.

7. In combination with a bearing assembly which includes a spindle, tapered roller bearings supporting the spindle at spaced points, and a bearing take-up nut threaded on the spindle adjacent one end thereof; an in-place wrench on and radiating from the nut, a fixed part adjacent the nut, and means normally but releasably securing the wrench to said fixed part.

8. In combination with a bearing assembly including a spindle, bearings on the spindle, fixed parts supporting opposite ends of the spindle, and a bearing take-up nut threaded on the spindle adjacent one fixed part; an in-place wrench on and radiating from the nut, and means normally but releasably securing the wrench to said one fixed part; the wrench when released from said one fixed part being in spaced relation to the latter to provide hand clearance.

ROBERT G. LE TOURNEAU.

REFERENCES CITED

The following references are of record in the file of this patent:

UNITED STATES PATENTS

| Number | Name | Date |
| --- | --- | --- |
| 1,211,585 | Hooper | Jan. 9, 1917 |
| 1,580,945 | Bartlett | Apr. 13, 1926 |
| 1,812,871 | Graves | July 7, 1931 |
| 2,002,403 | Kosma | May 21, 1935 |
| 2,210,742 | Whitney | Aug. 6, 1940 |